No. 746,937. PATENTED DEC. 15, 1903.
A. ELSENRATH.
NUT LOCK.
APPLICATION FILED APR. 16, 1903.
NO MODEL.

Witnesses:
J. P. Appleman
D. L. Davis

Inventor
A. Elsenrath
By John Noland
Atty.

No. 746,937. Patented December 15, 1903.

UNITED STATES PATENT OFFICE.

ANDREW ELSENRATH, OF ALLEGHENY, PENNSYLVANIA.

NUT-LOCK.

SPECIFICATION forming part of Letters Patent No. 746,937, dated December 15, 1903.

Application filed April 16, 1903. Serial No. 152,926. (No model.)

*To all whom it may concern:*

Be it known that I, ANDREW ELSENRATH, a citizen of the United States of America, residing at Allegheny, in the county of Allegheny and State of Pennsylvania, have invented certain new and useful Improvements in Nut-Locks, of which the following is a specification.

My invention relates to improvements in devices for locking nuts on bolts, so that the nut cannot work off the bolt on account of jolting or jarring and other causes.

My invention has for its further object a specially-constructed locking-key, and when once inserted in groove of bolt will insure a positive fastening means.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1:
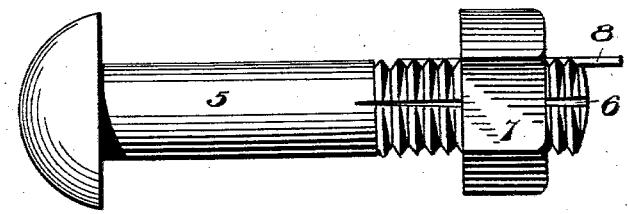
Figure 2:
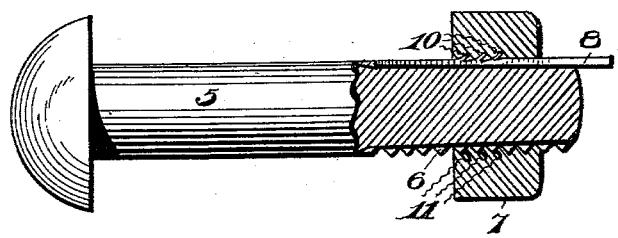
Figure 3:
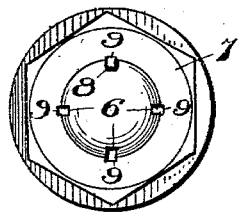
Figure 4:
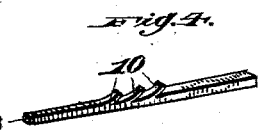

Figure 1 is a side view of bolt and nut with key inserted. Fig. 2 is a side view, partly in section. Fig. 3 is an end view showing grooves in bolt. Fig. 4 is a perspective view of key.

Referring to the drawings, 5 represents a bolt provided with a series of tapering wedge-shaped grooves 6, which run the length of threads on bolt. When the nut 7 is adjusted on bolt as desired and before key 8 is inserted therein, the grooves 9 in face of nut must be in alinement with grooves 6 of bolt. When the nut is permanently secured on bolt, it will appear as shown in Fig. 2, and the upturned spurs 10 will be seated in locking-recesses 11 of nut. The recesses 11 are in the inner wall of each groove 9 of the nut and the number of such recesses is immaterial.

The operation of my nut-lock is as follows: You screw the nut on the desired distance, and also until the slots 9 of nut are in alinement with grooves 6 of bolt. The key is then driven into the tapering groove until the spurs 10 spring into apertures 11, formed in nut.

I do not care to limit myself to the exact details of construction and operation set forth in the specification, and I may make changes in the same without departing from the spirit of my invention.

Having thus described my invention, what I claim as new, and desire to secure by Letters Patent, is—

In a nut-lock, a bolt having longitudinally-tapered grooves, a nut having grooves to register with the grooves of the bolt, said nut having recesses, a key fitted in the grooves of the nut and bolt and spurs in the key adapted to spring into the recesses of the nut.

In testimony whereof I affix my signature, in the presence of two witnesses, this 15th day of April, 1903.

ANDREW ELSENRATH.

Witnesses:
JOHN NOLAND,
J. P. APPLEMAN.